United States Patent [19]
Giacometti

[11] Patent Number: 5,727,322
[45] Date of Patent: Mar. 17, 1998

[54] ADJUSTABLE SHOE FOR A JIG SAW

[75] Inventor: Massimo Alberto Giacometti, Valmadrener, Italy

[73] Assignee: Black & Decker Inc., Newark, Del.

[21] Appl. No.: 775,542

[22] Filed: Dec. 31, 1996

[51] Int. Cl.$^6$ .......................... B23D 49/10; B23D 51/02
[52] U.S. Cl. .................................. 30/376; 30/392
[58] Field of Search ............... 30/376, 375, 392–394, 30/377, 388–391

[56] References Cited

U.S. PATENT DOCUMENTS

| | | |
|---|---|---|
| 3,033,312 | 5/1962 | Enders . |
| 3,087,519 | 4/1963 | McCarty et al. . |
| 3,146,809 | 9/1964 | Botefuhr . |
| 3,162,782 | 12/1964 | Downs . |
| 3,938,251 | 2/1976 | Kareman . |
| 4,262,421 | 4/1981 | Bergler et al. . |
| 5,517,763 | 5/1996 | Schilling et al. ............ 30/376 |
| 5,535,520 | 7/1996 | Armstrong . |
| 5,617,638 | 4/1997 | Amano et al. ............... 30/376 |
| 5,644,845 | 7/1997 | Durr et al. .................. 30/376 |

FOREIGN PATENT DOCUMENTS

| | | |
|---|---|---|
| 0185001 | 8/1988 | European Pat. Off. . |
| 0396540 | 12/1992 | European Pat. Off. . |
| 458715 | 4/1928 | Germany . |
| 4244079 | 6/1994 | Germany . |

*Primary Examiner*—Douglas D. Watts
*Attorney, Agent, or Firm*—Dennis A. Dearing; John D. Del Ponti; Charles E. Yocum

[57] ABSTRACT

A jig saw 30 includes a housing 32 and a keyless shoe 54 which can be adjusted relative to the housing to selectively position a cutting blade 48 for effecting a cut perpendicular to the plane of a workpiece 66, or a cut which is bevelled with respect to the plane of the workpiece. A locking mechanism 58 includes a lever 60 which is formed with a locking section 170 having a wide cross section portion and a narrow cross section portion. When making an adjustment, the locking mechanism 58 is unlocked by pivoting the lever 60 so that the narrow portion of the locking section 170 is in a prescribed alignment. After making the adjustment to a desired relative orientation and position between the housing 32 and the shoe 54, the lever 60 is pivoted to the locked position. In this position, the wide portion of the locking section 170 is placed in a prescribed alignment whereby the components of the locking mechanism 58 are locked, or tightened.

20 Claims, 7 Drawing Sheets

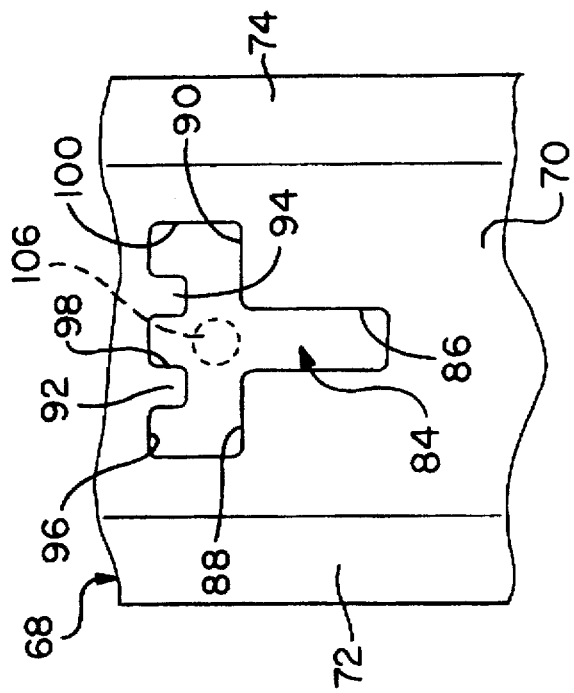
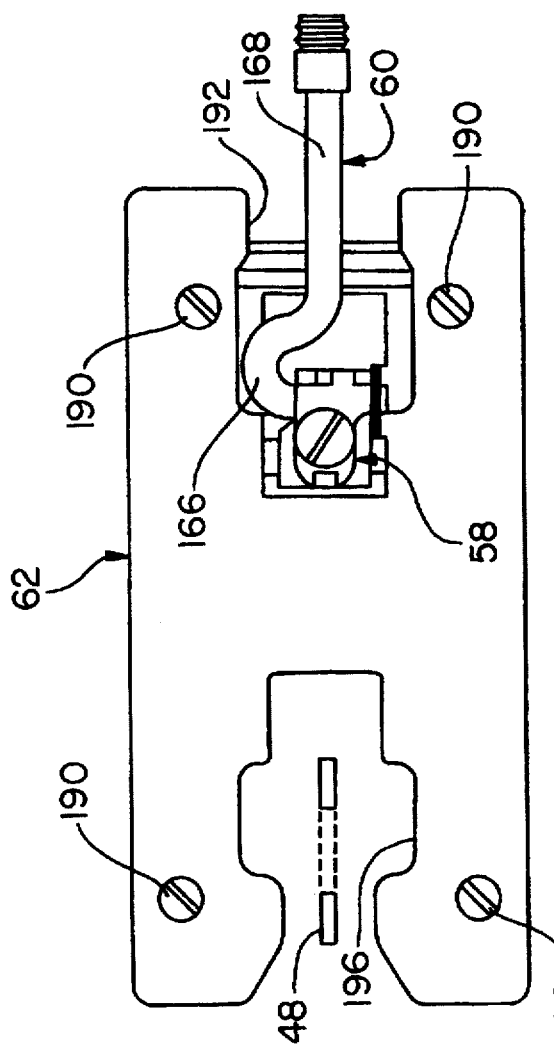
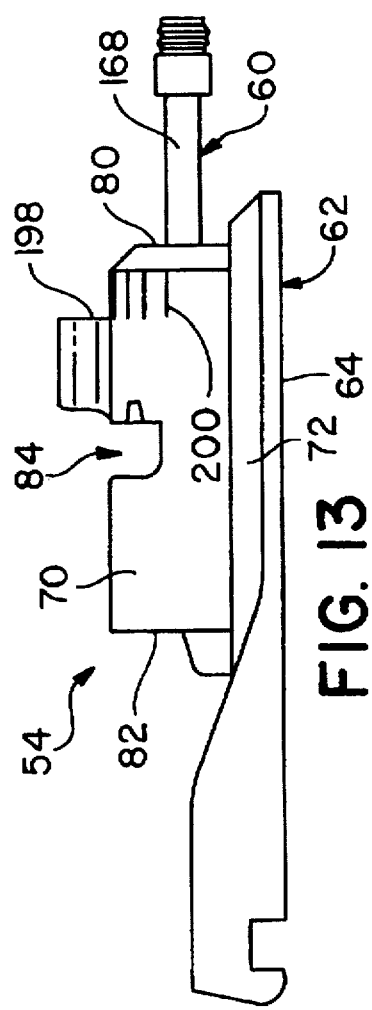

5,727,322

1

ADJUSTABLE SHOE FOR A JIG SAW

BACKGROUND OF THE INVENTION

This invention relates to an adjustable shoe for a jig saw and particularly relates to a jig saw with a work-engaging shoe which can be adjusted pivotally and longitudinally relative to a saw blade of the jig saw for bevelled and/or close cuts without the need for separate adjusting tools.

Electrically-powered portable jig saws have been in use for many years in scroll work to cut fine patterns such as simple and complex wavy and irregular lines, curves, circles and the like in a workpiece. Typically, a portable jig saw, sometimes referred to as a saber saw, includes a housing containing an electric motor for reciprocating a straight longitudinal saw blade which extends perpendicularly from the bottom of the housing adjacent the front thereof. The saw blade is formed with cutting teeth along one longitudinal edge which face toward the front of the housing. A shoe is attached to the bottom of the housing and provides a generally flat support for the jig saw during a cutting operation. For example, the flat bottom of the shoe can be placed on, and moved over, a workpiece being cut by use of the jig saw so that the user thereof can concentrate on guiding the saw blade to obtain the desired cutting pattern. The flat bottom of the shoe is formed with a wide slot through which the saw blade extends to engage the workpiece. During a cutting operation, the blade is reciprocated in its position below the bottom of the shoe while the jig saw is moved in a forward direction with the front of the jig saw being in a leading position. Generally, the saw blade is perpendicular to the plane of the bottom of the shoe whereby the blade forms a cut in the workpiece which is also perpendicular with respect to the orientation of the plane of the bottom of the shoe.

At times, the user may desire to form a bevel-edge cut in the workpiece. Bevel-edge cuts are formed at an angle with respect to the plane of the bottom of the shoe, other than the straight or perpendicular cut noted above. Jig saws which form bevel-edge cuts also have been available for many years. Such jig saws are provided with facilities for adjusting the position of the shoe with respect to the housing, and thereby with respect to the saw blade. By use of these facilities, the blade maintains its perpendicular orientation with respect to the housing but is at another angular orientation, other than perpendicular, with respect to the plane of the bottom of the shoe. For example, as described in U.S. Pat. No. 3,087,519, which issued on Apr. 30, 1963, the jig saw includes facility for pivoting an adjustable shoe about a front-to-rear longitudinal axis with respect to a housing thereof. The housing contains a motor and a motor-driven reciprocal mount for a flat saw blade which extends from the housing, through the shoe and from a plate at the bottom of the shoe in a conventional manner.

The shoe of the jig saw disclosed in U.S. Pat. No. 3,087,519 is adjustably attached to the base of the housing thereof by means of a clamping screw and a locking nut. In particular, a lever is attached to the nut which is captured within a housing of the jig saw but is free to rotate relative to the housing. A clamping screw extends from beneath the housing, through a clamp plate, through the top of the shoe, through an opening in the housing and threadedly into the nut. When an adjustment is to be made, the lever is pivoted about the axis of the screw and nut to effectively unscrew the screw partially from the nut. This action loosens the clamp plate and the shoe to allow an adjustment to be made. After the adjustment has been made, the lever is pivoted in the opposite direction to tighten the screw within the nut and, thereby, to secure the shoe and the housing together.

2

While the adjusting feature of the jig saw illustrated in U.S. Pat. No. 3,087,519 has performed well over the years, there is a need for a jig saw with an adjustable housing and shoe, and with a firm, repeatable locking mechanism to secure the housing and shoe in the adjusted position.

SUMMARY OF THE INVENTION

It is, therefore, an object of this invention to provide an adjustable shoe with a jig saw which is easy to adjust while providing a firm locking facility for securing a housing and a shoe of the jig saw in an adjusted position.

Another object of this invention is to provide an adjustable jig saw having a locking mechanism which is releasible for making adjustments and which provides a repeatable firm securance when placed in the locked condition.

With these and other objects in mind, this invention contemplates an adjustable shoe for a jig saw having a housing, wherein the shoe includes a clamping enclosure and a lever having a working section formed with locking structure thereon which is located within the enclosure. An element of the shoe is located between the clamping enclosure and a portion of the housing of the jig saw. A securing means secures the clamping enclosure, the element of the shoe and the housing together. The locking structure of the lever tightens together the secured clamping enclosure, shoe element and housing to lock firmly the shoe with the jig saw. The working section of the lever is also formed with structure which, upon movement of the lever, relaxes the securance of the element of the shoe with the housing so that an adjustment can be made. The lever is then moved to reposition the locking structure thereof to thereby tighten and lock the housing and shoe in the adjusted position.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 12 is a bottom view showing the shoe with the lever in the locked position;

FIG. 13 is a side view showing the shoe with the lever in the locked position; and FIG. 14 is a top view showing a slot formed through a shell of the shoe in accordance with certain principles of the invention.

DETAILED DESCRIPTION OF THE PREFERRED EMBODIMENT

Figure 1:
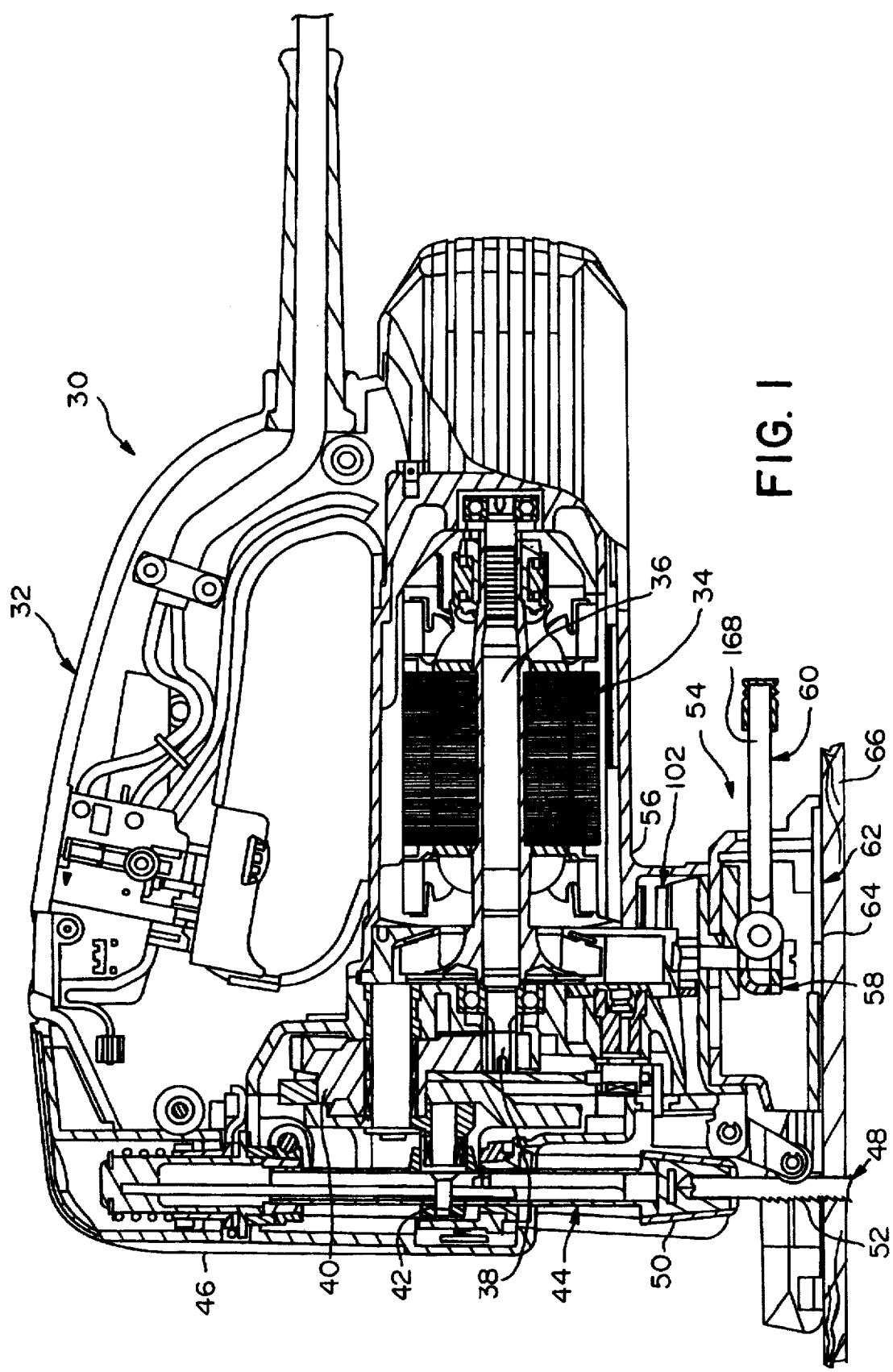
FIG. 1 is a side view with portions broken away of an adjustable shoe and a jig saw in accordance with certain principles of the invention.

As shown in FIG. 1, a jig saw 30 includes a housing 32 which contains a drive motor 34. A drive shaft 36 extends axially from the motor 34 and is formed with a drive pinion 38 at one end thereof which drives a spur gear 40. The rotary motion of the spur gear 40 is transformed into linear motion through a linear drive mechanism 42 to drive a sleeve 44 in a reciprocating motion. The sleeve 44 is mounted in a front portion 46 of the housing 32 and is perpendicular to the axis of the drive shaft 36. A flat jig saw blade 48 is secured to a lower end 50 of the sleeve 44 and extends from the bottom of the front portion 46 of the housing 32. The jig saw blade 48 is formed with cutting teeth 52 along a forward edge thereof facing in a direction forward of the jig saw 30.

A keyless shoe 54 is mounted adjustably for limited movement on, and extends below, an underside 56 of the housing 32 along a forward portion thereof. A locking mechanism 58 facilitates the securance of the shoe 54 with the underside 56 of the housing 32 and includes a lever 60 extending rearward thereof for relaxing and tightening the locking mechanism. The shoe 54 is movable, within limits, in a forward and a rearward direction relative to the jig saw 30 and parallel with the axis of the drive shaft 36 as viewed in FIG. 1. Also, the shoe 54 is partially rotatable within limits about an axis which is parallel with the axis of the drive shaft 36. The shoe 54 includes a bottom plate 62 which is flat and formed with a bottom surface 64.

In use of the jig saw 30, the bottom surface 64 of the plate 62 rests on a surface of a workpiece 66 (FIG. 10) and the saw is moved in a direction with the cutting teeth 52 of the reciprocating blade 48 facing forward of the direction of the movement. As the bottom surface 64 is moved over the engaging surface of the workpiece 66, the saw 30 is guided so that the reciprocating saw blade 48 cuts, for example, a slot or edge which is perpendicular to the plane of the workpiece. The position of the shoe 54 relative to the housing 32 can be adjusted rearwardly to allow for added forward movement of the saw 30 when cutting in close areas. Also, the shoe 54 can be partially rotated or tilted for a side-to-side adjustment relative to the housing 32 so that the blade 48 is tilted at an angle relative to the bottom surface 64 of the bottom plate 62. In the tilted position, the blade 48 cuts a bevelled slot or edge in the workpiece 66 as the saw is moved in the forward direction.

Figure 2:
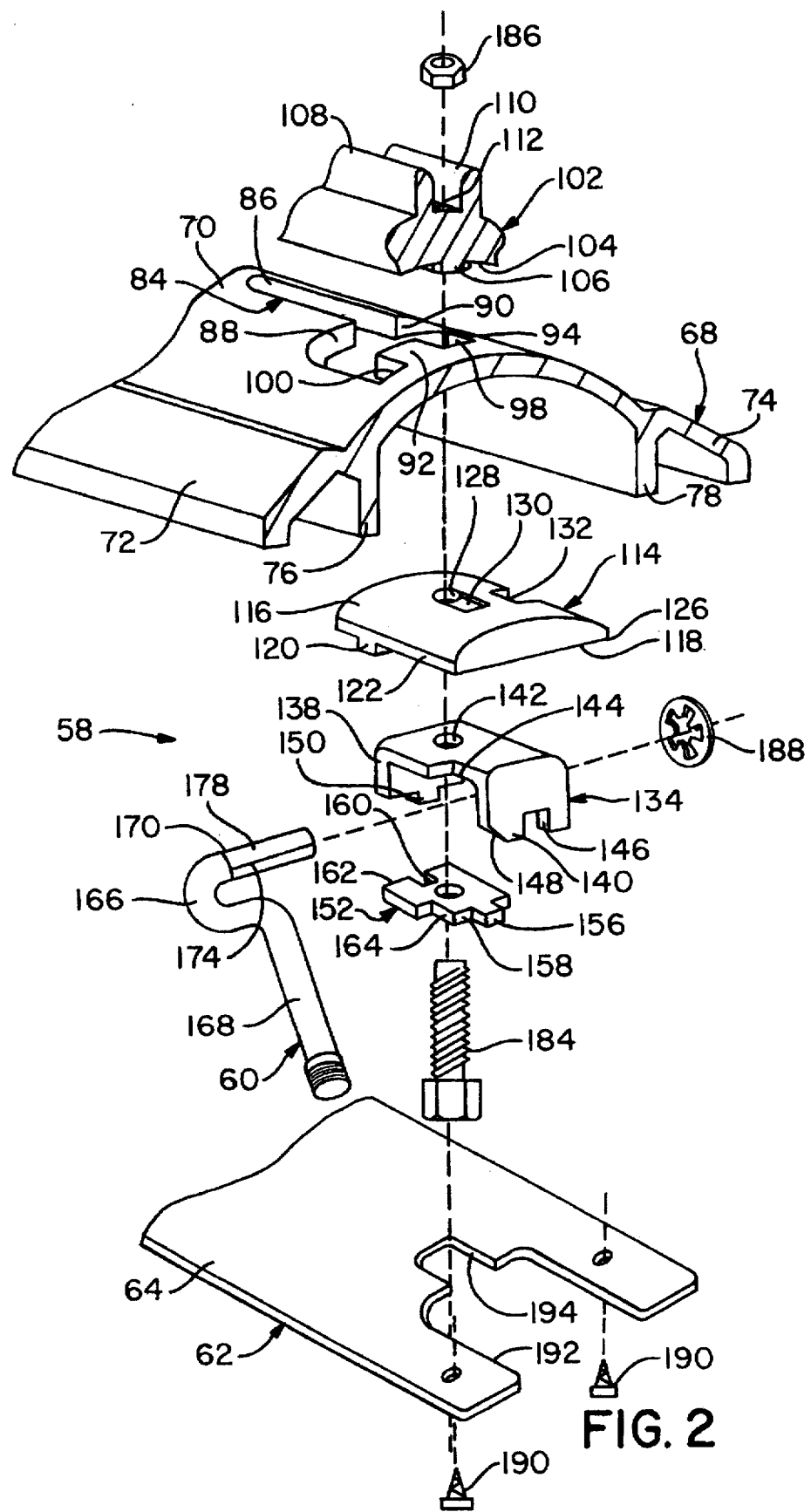
FIG. 2 is an exploded perspective view showing various components of a locking mechanism of the adjustable shoe and jig saw of FIG. 1 in accordance with certain principles of the invention.

Referring to FIG. 2, the keyless shoe 54 includes an upper housing shell 68, partially shown, which is formed with a domed roof 70 having an outwardly projecting convex surface. The shell 68 is also formed with downwardly angled side flanges 72 and 74 and spaced vertical walls 76 and 78 extending downward from the side edges of the roof 70. The roof 70, the flanges 72 and 74, and the vertical walls 76 and 78 extend from one end 80 (FIG. 13) of the shell 68 to an opposite end 82 (FIG. 13) thereof. As shown in FIGS. 2 and 14, a slot 84 of prescribed shape is formed through the roof 70 and includes an axial wing 86 which extends longitudinally of the shell 68, and a first lateral wing 88 and a second lateral wing 90. As viewed in FIG. 14 from the top of the shell 68, the slot 84 is formed generally in a "T" shaped configuration. A first tooth 92 extends from one wall of the first lateral wing 88 in the same direction as the axial wing 86. A second tooth 94, spaced laterally from the first tooth 92, is formed in similar fashion in the second lateral wing 90. With the two teeth extending from a common wall of the slot 84, three spaces 96, 98 and 100 are formed on opposite sides and between the teeth as viewed in FIG. 14.

Referring again to FIG. 2, the underside of the housing 32 of the saw 30 is formed with a runner 102 which has a concave bottom surface 104 complementary to the convex surface of the domed roof 70 of the shell 68. The runner 102 is formed with a lug 106 which extends downward from a central portion of the concave bottom surface 104. The lug 106 is located for insertion into the slot 84 of the shell 68 to facilitate relative movement of the shell with respect to the lug whereby the lug is selectively positionable within the axial wing 86, the lateral wings 88 and 90, and within the spaces 96, 98 and 100. The runner 102 is formed with a pair of upstanding walls 108 and 110, which are spaced apart by a prescribed distance, and a through hole 112.

Figure 5:
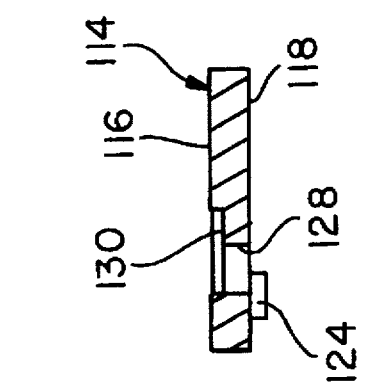
FIG. 5 is a sectional view showing the plate of FIG. 3 in accordance with certain principles of the invention.
Figure 4:
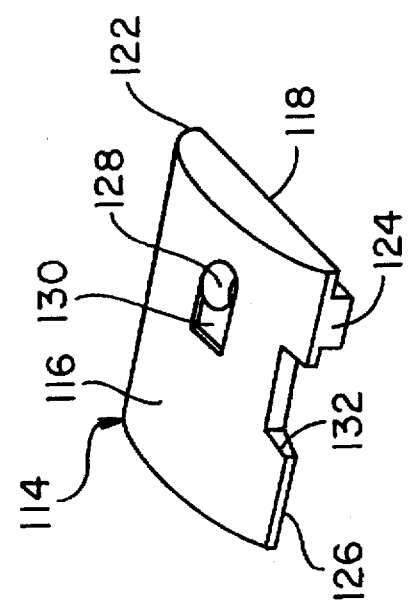
FIG. 4 is a perspective view showing the plate of FIG. 3 in accordance with certain principles of the invention.
Figure 3:
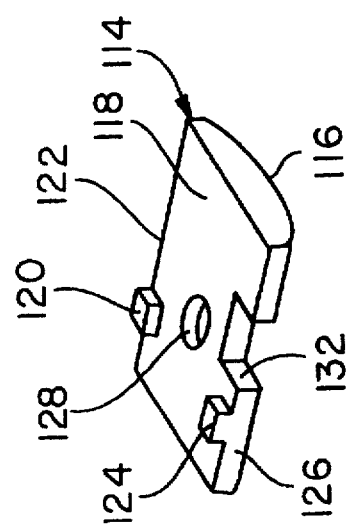
FIG. 3 is a perspective view showing a first plate of the locking mechanism of FIG. 2 in accordance with certain principles of the invention.

As further shown in FIG. 2, and in FIGS. 3, 4 and 5, the locking mechanism 58 includes a first plate 114 formed with a convex upper surface 116 which is complementary to a concave inner surface 118 (FIG. 2) of the shell 68. A bottom surface 118 of the plate 114 is flat and is formed with a first lug 120, adjacent one edge 122 of the plate, and a second lug 124, adjacent an opposite edge 126 of the plate, with both lugs being spaced apart and extending away from the bottom surface. A generally central portion of the plate 114 is formed with a hole 128 extending through the plate, and a recess 130 in the convex upper surface 116 of the plate, the recess being in communication with the hole 128. Also, a slot 132 is formed generally centrally in the edge 126 of the plate 114.

Figure 6:
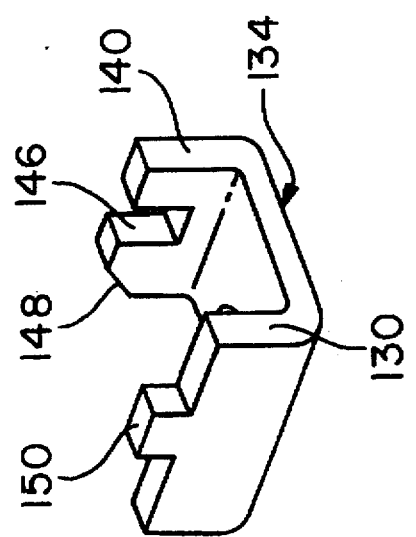
FIG. 6 is a perspective view showing a second plate of the locking mechanism of FIG. 2 in accordance with certain principles of the invention.

The locking mechanism 58 also includes a second plate 134 as shown in FIGS. 2 and 6. The plate 134 is formed with a flat central section 136, a first folded flat section 138 and a second folded flat section 140. The folded sections 138 and 140 extend perpendicularly from opposite sides of the central section 136 in the same direction. A hole 142 is formed through the central section 136 which is also formed with a notch 144 in one corner thereof. A slot 146 is formed centrally in the outboard edge of the folded section 140 which is also formed with a bevelled corner edge 148. A lug 150 is formed centrally from the outboard edge of the folded section 138.

The locking mechanism 58 further includes a third plate 152 which is flat in a planar fashion, as shown in FIG. 2, and is formed with a generally central hole 154 therethrough. The plate 152 is formed with a lug 156 extending from an edge 158 thereof and with a slot 160 into another edge 162 thereof opposite the edge 158. A notch 164 is formed in a corner of the third plate 152 at one end of the edge 158.

Figure 7:
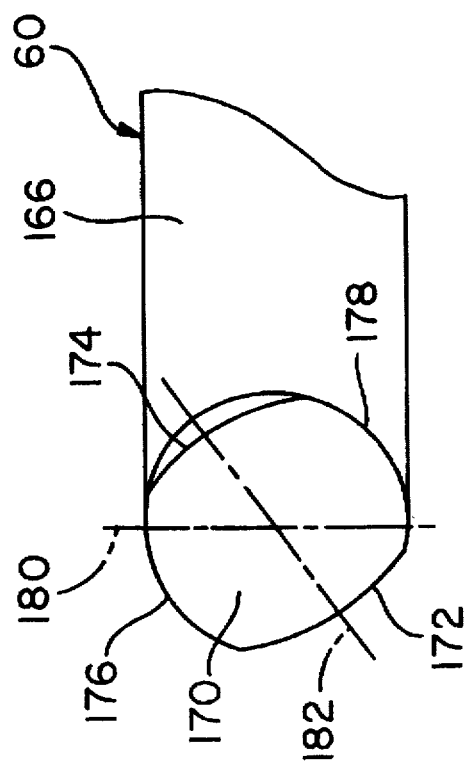
FIG. 7 is an end view showing a working section of a lever of the locking mechanism of FIG. 2 in accordance with certain principles of the invention.
Figure 10:
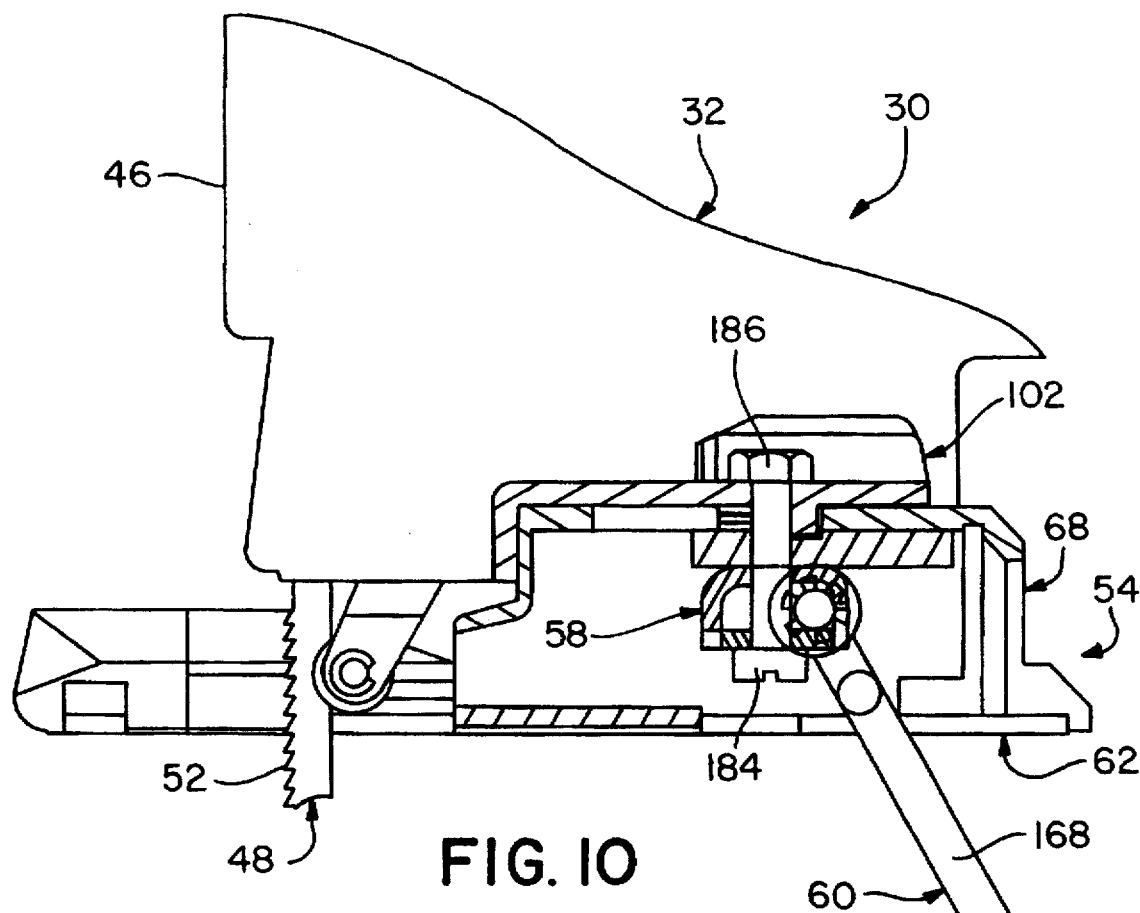
FIG. 10 is a side view showing the shoe and the jig saw with the lever of FIG. 7 in the unlocked position.

The lever 60 is formed with a "U" shaped central section 166 one end of which is joined integrally and perpendicularly with a straight rod-like handle section 168, and the other end of which is joined integrally with a locking section 170 extending axially therefrom. While the sections 166 and 168 of the lever 60 are generally round, the locking section 170 has a cross section, as shown in FIG. 7; which is generally oblong. In particular, a first set of opposed convex surfaces 172 and 174 of the cross section of the locking section 170 are each formed generally with an arc having a first radius which is the same as the radius of the arc of the opposed surface. A second set of opposed convex surfaces 176 and 178 of the cross section of the locking section 170 are each formed generally with an arc having a second radius which is the same as the radius of the arc of the opposed surface but different from the first radius. As shown in FIG. 7, the opposed surfaces 172 and 174 are closer to each other than the opposed surfaces 176 and 178 are to each other. This provides generally an oblong cross section configuration of the locking section 170 such that when the handle section 168 is in a locked position, as shown in FIG. 1, the widest cross section of the locking section is located along a vertical centerline 180, as shown in FIG. 7. When the handle section 168 is in an unlocked position, as shown in FIG. 10, the narrowest cross section, which is aligned with centerline 182 as shown in FIG. 7, is in the vertical alignment previously occupied by the centerline 180.

Referring again to FIG. 2, a bolt 184 and a nut 186 are used to maintain the plates 114, 134 and 152 in assembly with the shell 68 and the runner 102. Further, a spring washer 188 is forced onto the end of the locking section 170 to retain the lever 60 in its assembled location. The bottom plate 62 is placed against the underside of the vertical walls 76 and 78 and is secured to the shell 68 by four screws 190 as shown in FIGS. 2 and 12. As further shown in FIG. 2, one end of the bottom plate 62 is formed with a large opening 192 in an end edge of the plate and a smaller opening 194 in communication with the larger opening. The openings 192 and 194 of plate 62 provide a clearance space for lever 60 when the locking mechanism 58 is in the unlocked state. As shown in FIG. 12, an opening 196 is formed in the opposite edge of the bottom plate 62 for passage and positioning of the saw blade 48.

Figure 8:
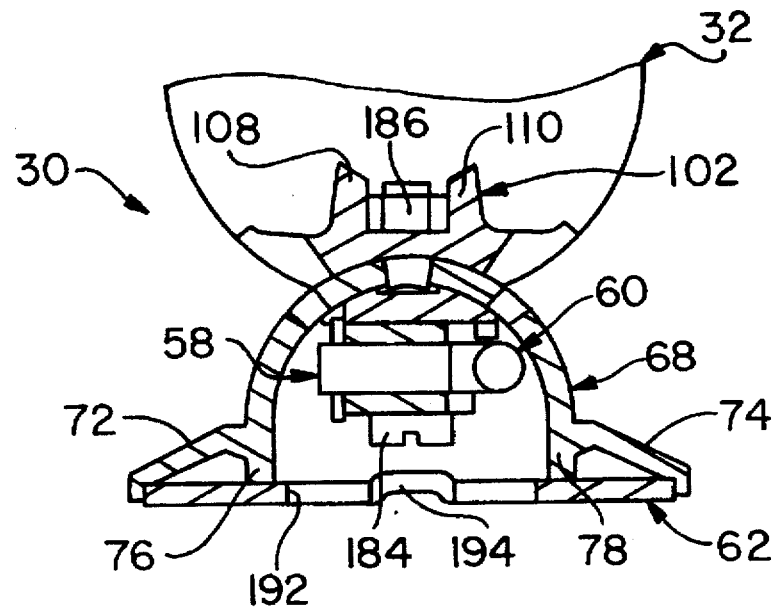
FIG. 8 is an end view showing the relationship between the jig saw and the shoe in a one orientation with the lever of FIG. 7 in a locked position.

Referring to FIG. 13, the runner 102 is formed with a surface 198 which faces to the rear of the saw 30 and is formed with a marker in the center thereof. A plurality of radial marks 200 are placed on the top of the domed roof 70 of the shell 68 near a rear portion thereof and extend equally on opposite sides from the top center thereof. The radial marks 200 represent angular displacement in degrees from the top center of the domed roof 70, for example, in increments of fifteen degrees. Thus, if three marks 200 are formed on each side of a center or zero mark, the marks would represent a maximum of forty-five degrees on each side of the zero mark. When the shoe 54 is aligned with the housing 32 as shown in FIG. 8, the marker on the runner 102 is aligned with the zero mark 200 on the domed roof 70 of the shell 68. The housing 32 can be adjusted relative to the shoe 54 to a selected angle, up to forty-five degrees, for example in the direction shown in FIG. 11. The housing 32 and the shoe 54 are move relatively so that the marker on the runner 102 is aligned with the mark 200 on the domed roof 70 representing the selected angle. The housing 32 could also be tilted in the opposite direction, up to a maximum of forty-five degrees in the same manner. Of course, the locking mechanism 58 would be relaxed to permit the desired relative adjustment between the housing 32 and the shoe 54 and then tightened to lock the housing and the shoe in the desired adjusted position.

Referring again to FIG. 2, one of several different orders in which components of the locking mechanism 58 can be assembled includes the preassembly of the first, second and third plates 114, 134 and 152, respectively, so that their respective holes 128, 142 and 154 are aligned. When assembling the plate 134 with the plate 114, the central section 136 nests between the lugs 120 and 124 of the of the plate 114. Also, when assembling the third plate 152 with the second plate 134, the lug 156 of the third plate fits into the slot 146 of the second plate and the lug 150 of the second plate fits into the slot 160 of the third plate. The bolt 184 is then inserted through the aligned holes 154, 142 and 128 of the third, second and first plates 152,134 and 114, respectively. The preassembled plates 114, 134 and 152, and the bolt 184, are then positioned so that the convex surface 116 of the first plate 114 is in engagement with the concave surface 118 of the shell 68, and so that the upper end of the bolt extends through the portion of the slot 84 formed by the axial wing 86 and the space 98. In this arrangement, the recess 130 of the first plate 114 is also aligned with the axial wing 86 and the space 98.

Thereafter, the convex surface of the domed roof 70 of the shell 68 is moved into engagement with the concave bottom surface 104 of the runner 102 with the top of the bolt 184 extending through the hole 112 of the runner. During this assembly operation, the lug 106 is aligned with the recess 130 of the first plate 114. The nut 186 is then positioned between the spaced walls 108 and 110 of the runner 102 and is precluded from rotating due opposed flats of the nut being located closely with the spaced walls. The bolt 184 is then rotated to draw the nut 186 onto the bolt to the extent that the assembled components are held loosely together. As the nut 186 is drawn onto the bolt 184, the lug 106 of the runner 102 moves through the slot 84 and partially into the recess 130.

The locking section 170 of the lever 60 is moved into a confined space formed on opposite sides thereof between a middle portion of the bolt 184 and the folded flat section 140 of the second plate 134. The free end of the locking section 170 extends from the opposite side of the space. The spring washer 188 is placed on the free end of the locking section 170 of the lever 60 to preclude the locking section from moving back through the space thereby insuring that the lever is retained with the other components of the locking mechanism. The slot 132 formed in the first plate 114 provides a clearance for the spring washer 188. The notches 144 and 154 of the second and third plates 134 and 152 provide clearance for adjacent portions of the lever 60.

Figure 9:
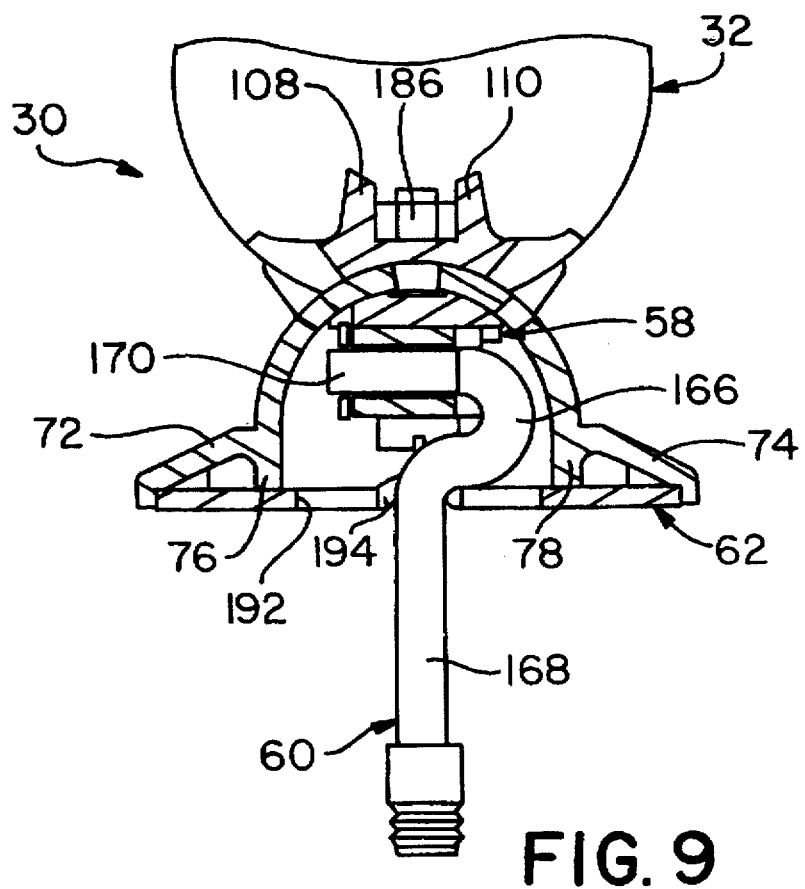
FIG. 9 is an end view showing the relationship between the jig saw and the shoe in a one orientation with the lever of FIG. 7 in an unlocked position.

The lever 60 is then positioned so that the widest cross section portion of the locking section 170 is positioned as shown in FIG. 7 with the centerline 180 being in a vertical orientation. This is accomplished by positioning the handle section 168 in a horizontal plane as illustrated in FIGS. 1 and 13. The bolt 184 is then firmly tightened to draw all of the components firmly together and to seat the lug in the recess 130. The locking mechanism 58 is now in the locked condition to hold the housing 32 and the shoe 54 firmly together in the planar, or zero degrees, alignment as illustrated in FIG. 9. The bottom plate 62 can now be assembled with the shell 68 as described above.

When an adjustment is to be made, that is a relative reorientation between the housing 32 and the shoe 54, the handle section 168 of the lever 60 is pivoted to the position illustrated in FIGS. 9 and 10. This action causes the locking section 170 of the lever to be rotated so that, as viewed in FIG. 7, the centerline 182 is moved to the vertical position. In this position, the narrowest portion of the cross section of the locking section 170 is aligned vertically and the components of the locking mechanism 58 are relaxed from the previous tight, or locked, condition. The shell 68 can now be moved relative to the runner 102, which is integral with the housing 32, and the other relaxed components of the locking mechanism 58.

Referring to FIG. 14, assume that the lug 106 was previously located in the space 98 of the slot 84 and the operator desired to move the lug to the opposite end of the axial wing 86 of the slot, the operator can now effect such a move by moving the shell 68 relative to the housing 32. The lever 60 is the pivoted to the position shown in FIGS. 1, 8 and 13 whereby the centerline 180 (FIG. 7) is returned to the vertical position as is the widest cross section of the locking section of the lever. This action urges the components of the locking mechanism 58 into a locked, or tightened, condition whereby the shoe 54 and the housing 32 are locked in this position. This adjustment allows the relative positioning of the shell 68 and the housing 32 to any position between the closed end of the axial wing 86 of the slot 84 and the closed end of the space 98, and facilitates positioning of the blade 48 relative to the shoe 54 as illustrated in FIG. 12.

Figure 11:
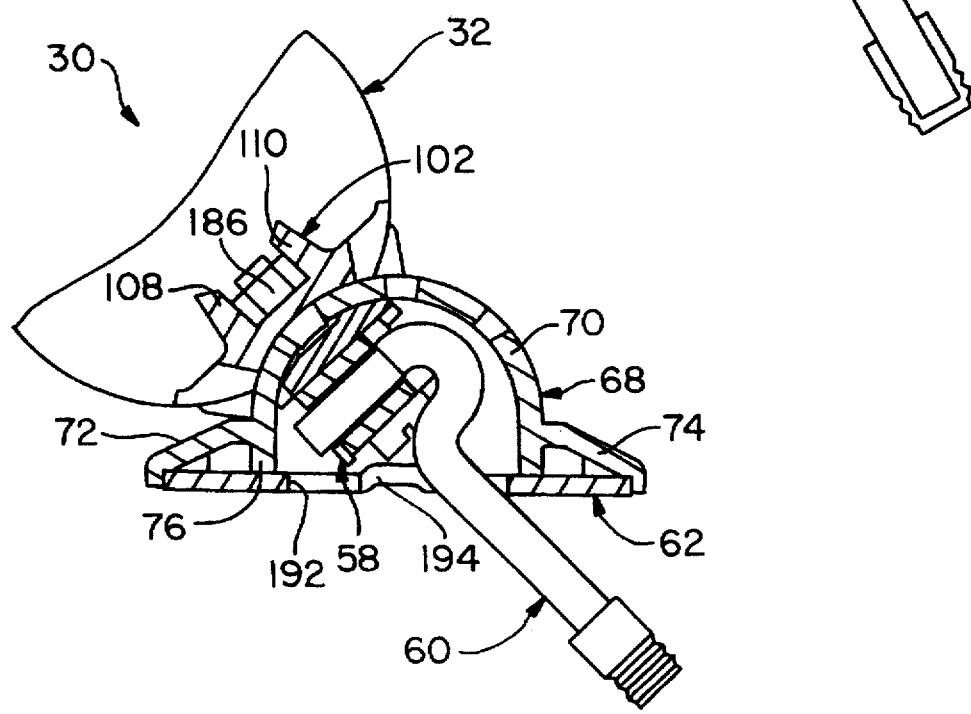
FIG. 11 is an end view showing the relationship between the jig saw and the shoe in another orientation with the lever of FIG. 7 in an unlocked position.

When it is desired to tilt the housing. 32 relative to the shell 68, for example as shown in FIG. 11, the lever 60 is moved to the unlocked position as shown in FIGS. 9 and 10. The housing 32 and the shell 68 are moved relatively so that the lug 106 is located in the plane of the first and second lateral wings 88 and 90 of the slot 84 as shown in FIG. 14. Assume that operator wishes to tilt the housing 32 to the left as viewed in FIG. 11, the housing and the shell 68 are moved relatively so that the lug 106 (FIG. 14) moves into the second lateral wing 100 of the slot 84 to any desired position. Thereafter, the locking mechanism 58 is locked in the adjusted position.

If the operator moves the lug 106 and housing 32 to the forty-five degrees position as noted above, the operator has the option to lock the locking mechanism 58 while the lug is in the closed end of the second lateral wing 100 or to move the lug into the space 100 to obtain further adjustment between the housing and the shell 68.

In addition, the operator has the option of making an adjustment so that the housing 32 is tilted to the right, up to forty-five degrees from the position illustrated in FIG. 9.

By use of the adjusting features of this invention, the operator merely has to pivot the lever 60 to the unlocked position, make the adjustment and pivot the lever to the locked position. In addition, the operator has the option of making the adjustment to any of several positions between the closed end of the axial wing 86 and the closed end of the space 98, between the closed ends of the first and second lateral wings 88 and 90, and into the spaces 96 and 100. The versatility, ease of making the adjustments and the many optional positions available with the jig saw 30 enhance the performance of a work effort when using the jig saw.

In general, the above-identified embodiments are not to be construed as limiting the breadth of the present invention. Modifications, and other alternative constructions, will be apparent which are within the spirit and scope of the invention as defined in the appended claims.

What is claimed is:

1. An adjustable shoe for a jig saw having a housing, which comprises:

a clamping enclosure;

a lever having a working section formed with locking structure thereon located within the enclosure;

an element of the shoe located between the clamping enclosure and a portion of the housing of the jig saw;

securing means for securing the clamping enclosure, the element of the shoe and the housing together;

the locking structure of the lever when positioned in a prescribed orientation within the clamping enclosure tightening together the secured clamping enclosure, shoe element and housing to lock firmly the shoe with the jig saw.

2. The adjustable shoe as set forth in claim 1, which further comprises:

the working section of the lever being formed with a relaxing structure which, when placed in a second prescribed orientation within the clamping enclosure, relaxes the tightening of the element of the shoe with the housing so that an adjustment therebetween can be made.

3. The adjustable shoe as set forth in claim 1, wherein the clamping enclosure comprises:

a first plate having a first structure;

a second plate having a second structure;

the first and second plates being assembled with the first structure and the second structure being combined to form an opening; and the working section of the lever being located in the opening.

4. The adjustable shoe as set forth in claim 3, wherein the securing means retains together the first plate and the second plate and allows relative movement therebetween.

5. The adjustable shoe as set forth in claim 4, which further comprises:

the working section of the lever being formed with structure which, when placed in a second prescribed orientation within the opening of the clamping enclosure, relaxes the tightening of the element of the shoe with the housing so that an adjustment therebetween can be made.

6. The adjustable shoe as set forth in claim 1, which further comprises:

a plate located between the clamping enclosure and the element of the shoe; and the plate being secured in place by the securing means.

7. The adjustable shoe as set forth in claim 1, which further comprises:

retaining means for retaining the working section of the lever within the clamping enclosure.

8. The adjustable shoe as set forth in claim 3, which further comprises:

the locking structure of the lever having a prescribed width sufficient to spread the first and second plates relative to each other to tighten and lock the shoe element and the housing firmly.

9. The adjustable shoe as set forth in claim 2 wherein the locking structure of the working section of the lever is formed by a portion thereof of a first dimension and the relaxing structure of the working structure is formed by a portion thereof of a second dimension which is less than the first dimension.

10. The adjustable shoe as set forth in claim 1, which further comprises:

a slot of a prescribed configuration formed in a portion of the element of the shoe; and the securing means having portions which extend through the slot.

11. The adjustable shoe as set forth in claim 10, which further comprises:

a lug formed on the housing and extending through the slot.

12. The adjustable shoe as set forth in claim 11, which further comprises:
   a locking mechanism formed at least by the clamping enclosure;
   the locking mechanism formed with a recess located adjacent the slot for reception of the lug extending through the slot.

13. The adjustable shoe as set forth in claim 1, which further comprises:
   a slot generally of a "T" shaped configuration formed through the element of the shoe.

14. The adjustable shoe as set forth in claim 13, wherein the "T" shaped slot has at least two spaces formed in an upper portion of a cross arm of the slot.

15. The adjustable shoe as set forth in claim 13, wherein the housing is formed with a lug which extends into the slot of the element to facilitate relative adjusting movement of the shoe and the housing within limits imposed by the "T" shaped slot.

16. An adjustable shoe for a jig saw having a housing, which comprises:
   a locking mechanism;
   a first plate of the locking mechanism having a first prescribed structure;
   a second plate of the locking mechanism having a second prescribed structure complementary to the first prescribed structure for joining with the first plate;
   an enclosure formed by placing the first and second plates together, which enclosure is expandable to a first prescribed opening and contractible to a second prescribed opening by permissible relative movement between the first and second plates;
   an element having a slot formed therethrough at a second prescribed location;
   a fastener extending through the slot of the element for coupling together the locking mechanism, including the first and second plates, and the housing of the jig saw with the element being sandwiched therebetween;
   a lever having a working section formed with structure located within the enclosure formed by the first and second plates;
   the structure of the lever having a first portion which, when placed in a first prescribed position, expands the placement of the first and second plates to a locking placement to tighten the assembly of the locking mechanism, the element and the housing to a limit allowed by the fastener; and
   the structure of the lever having a second portion which, when placed in a second prescribed position, allows the first and second plates to relax from the locking placement of the first and second plates to allow movement of the element relative to the housing and the locking mechanism.

17. The adjustable shoe as set forth in claim 16, which further comprises:
   a slot of a prescribed shape formed through the element; and
   a lug formed on the housing and extending through the slot into engagement with the locking mechanism.

18. The adjustable shoe as set forth in claim 17, which further comprises:
   a recess formed on the locking mechanism and positioned to receive the lug therein.

19. The adjustable shoe as set forth in claim 17, wherein the prescribed shape of the slot is "T" shaped to allow the lug to move within the confines of the slot and provide a plurality of selectable relative positions between the shoe and the housing.

20. The adjustable shoe as set forth in claim 16, wherein the first portion of the working section of the lever is formed by a first segment thereof of a first dimension and the second portion of the working structure is formed by a second segment thereof of a second dimension which is less than the first dimension.

* * * * *